United States Patent [19]
Suzuki et al.

[11] Patent Number: 5,618,506
[45] Date of Patent: Apr. 8, 1997

[54] PROCESS FOR REMOVING CARBON DIOXIDE FROM GASES

[75] Inventors: Hitomi Suzuki, Kyoto; Atsushi Hayakawa, Nara; Tomio Mimura, Osaka; Shigeru Shimojo, Osaka; Hidenobu Shimayoshi, Osaka; Masaki Iijima, Tokyo; Shigeaki Mitsuoka; Toru Iwaki, both of Hiroshima, all of Japan

[73] Assignees: The Kansai Electric Power Co., Inc., Osaka; Mitsubishi Jukogyo Kabushiki Kaisha, Tokyo, both of Japan

[21] Appl. No.: 511,290

[22] Filed: Aug. 4, 1995

[30] Foreign Application Priority Data

| Oct. 6, 1994 | [JP] | Japan | 6-242915 |
| Mar. 16, 1995 | [JP] | Japan | 7-057120 |
| Mar. 23, 1995 | [JP] | Japan | 7-064030 |
| Mar. 23, 1995 | [JP] | Japan | 7-064031 |

[51] Int. Cl.$^6$ .................................... C01B 17/16
[52] U.S. Cl. .................. 423/228; 423/226; 423/229
[58] Field of Search .................... 423/226, 228, 423/229

[56] References Cited

U.S. PATENT DOCUMENTS

| 3,622,267 | 11/1971 | Bartholome et al. | 23/2 R |
| 3,856,921 | 12/1974 | Shrier et al. | 423/228 |
| 4,094,957 | 6/1978 | Sartori et al. | 423/223 |
| 4,112,052 | 9/1978 | Sartori et al. | 423/228 |
| 4,217,238 | 8/1980 | Sartori et al. | 252/192 |
| 4,336,233 | 6/1982 | Appl et al. | |
| 4,405,578 | 9/1983 | Sartori et al. | |
| 4,551,158 | 11/1985 | Wagner et al. | 55/46 |
| 4,581,209 | 4/1986 | Oswald et al. | 423/223 |
| 5,246,619 | 9/1993 | Niswander | 252/183.11 |

FOREIGN PATENT DOCUMENTS

| 558019A2 | 9/1993 | European Pat. Off. |
| 0558019A2 | 9/1993 | European Pat. Off. |
| 0588178A2 | 3/1994 | European Pat. Off. |
| 0647462A1 | 4/1995 | European Pat. Off. |
| 0672446A2 | 9/1995 | European Pat. Off. |
| 1542415 | 4/1970 | Germany. |
| 1904428 | 8/1970 | Germany. |
| 52-63171 | 5/1977 | Japan. |
| 53-100180 | 9/1978 | Japan. |
| 61-71819 | 4/1986 | Japan. |

OTHER PUBLICATIONS

Chemical Engineering Science, vol. 41, No. 2, 1986, pp. 405–408, "Absorption rates of carbon dioxide and hydrogen sulphide in . . . "

Chemical Engineering Science, vol. 41, No. 4, 1986, pp. 997–1003 "$CO_2$ Absorption in Aqueous Solutions of Hindered Amines".

*Primary Examiner*—Deborah Jones
*Assistant Examiner*—Amy M. Harding
*Attorney, Agent, or Firm*—Jacobson, Price, Holman & Stern, PLLC

[57] ABSTRACT

This invention relates to the process for removing $CO_2$ from $CO_2$-containing gas such as combustion gas. For example, it is the process for removing $CO_2$ from combustion gas through the contact of the gas at the atmospheric pressure with an aqueous solution of an amine represented by the general formula $R^1NHC(CH_3)_2CH_2OH$ in which $R^1$ is a lower alkyl group having 1–4 carbon atoms, or an aqueous solution containing both an amine represented by the general formula $R_2CHR_3NHCH_2CH_2OH$ in which $R^2$ is a hydrogen atom or a lower alkyl group having 1–4 carbon atoms and $R^3$ is a hydrogen atom or methyl group and a piperazine compound selected from the group consisting of piperazine, 2-methylpiperazine, 2,3-dimethylpiperazine, and 2,5-dimethylpiperazine, or an mixed aqueous amine solution containing a secondary amine and a tertiary amine at concentrations of 10–45% by weight each, or an aqueous solution of a piperazine derivative.

11 Claims, 2 Drawing Sheets

PROCESS FOR REMOVING CARBON DIOXIDE FROM GASES

BACKGROUND OF THE INVENTION

1. Field of the Invention

The present invention relates to a process for removing carbon dioxide ($CO_2$) from gases such as combustion gases. More particularly, it relates to a process for efficiently removing $CO_2$ from combustion gases or the like at the atmospheric pressure using an aqueous solution containing a specific amine compound.

2. Description of the Related Art

Heretofore varied approaches have been studied and proposed for the recovery and removal of acid gases, especially $CO_2$, from various gases (to be treated), such as industrial gases and combustion gases generated in chemical plants handling natural and synthetic gases. With combustion gases, for example, intensive studies are being made for the removal and recovery of $CO_2$ from the gases through contact with an aqueous alkanolamine solution or for the storage of the recovered $CO_2$ instead of releasing it to the atmosphere.

In recent years the greenhouse effect of $CO_2$ has been found partly responsible for the global warming, and counteracting that effect is urgently needed across the world to protect the environment on the earth. The source of $CO_2$ is omnipresent in the whole areas of human activities that involve the combustion of fossil fuels, and the tendency is toward more and more stringent emission control. In view of these, energetic studies are under way on the removal and recovery of $CO_2$ from boiler combustion gases, especially from the gases produced by power-generating installations such as steam power plants that burn enormous quantities of fossil fuels, through contact with an aqueous alkanolamine solution or the like or on the storage of the recovered $CO_2$ without discharge to the atmosphere.

Examples of the alkanolamine are monoethanolamine, diethanolamine, triethanolamine, N-methyldiethanolamine (MDEA), diisopropanolamine, and diglycolamine. Usually, monoethanolamine (MEA) is used by preference. Aside from these, the use of secondary and tertiary hindered amines in the form of aqueous solutions is under investigation.

Aqueous solutions of these alkanolamines, typified by MEA, have been used as liquid absorbents for the absorption and removal of $CO_2$ from combustion gases. However, they have not always proved satisfactory in view of the $CO_2$ absorption quantity per given quantity of each aqueous amine solution at a given concentration, the $CO_2$ absorption quantity per unit amine molar amount of the aqueous amine solution at a given concentration, the rate of $CO_2$ absorption at a given concentration, and the thermal energy required for the regeneration of the spent aqueous alkanolamine solution after the absorption.

As for the separation of acid gases from various mixed gases through the medium of amine compounds, many techniques are known in the art.

Japanese Patent Provisional Publication No. 100180/1978 discloses a process for the removal of acid gas which comprises contacting a normally gaseous mixture with an amine-solvent liquid absorbent consisting of (1) an amine mixture composed of at least 50 mol % of a sterically hindered amine which contains at least one secondary amino group bound to either a secondary carbon or tertiary carbon or a primary amino group bound to a tertiary carbon, forming a part of the ring, and at least about 10 mol % of a tertiary amino-alcohol and (2) a solvent for the amine mixture which serves as a physical absorbent for the acid gas. Examples cited of the sterically hindered amine are 2-piperidineethanol[2-(2-hydroxyethyl)-piperidine] and 3-amino-3-methyl-1-butanol and examples of the solvent are sulfoxide compounds which may contain up to 25 wt % water. As regards the gas to be treated, the reference publication, p.11, upper left col., mentions "a normally gaseous mixture containing carbon dioxide and hydrogen sulfide at high concentrations, e.g., 35% $CO_2$ and 10-12% $H_2S$" and uses $CO_2$ itself in its working example.

Japanese Patent Provisional Publication No. 71819/1986 describes a composition for acid gas scrubbing which contains a hindered amine and a nonaqueous solvent such as sulfolane. The publication explains the advantage of the hindered amine in the absorption of $CO_2$, with the aid of a reaction formula.

*Chemical Engineering Science*, Vol.41, No.4, pp.997–1003, reveals the carbonic acid gas absorption behavior of an aqueous solution of 2-amino-2-methyl-1-propanol (AMP), a hindered amine. As the gases to be absorbed, $CO_2$ at the atmospheric pressure and a mixture of $CO_2$ and nitrogen were used.

*Chemical Engineering Science*, Vol. 41, No. 2, pp. 405–408, reports the rates of $CO_2$ and $H_2S$ absorption by the aqueous solutions of hindered amines such as AMP and of straight-chain amines such as MEA at around ordinary temperatures.

U.S. Pat. No. 3,622,267 teaches a technique of purifying a synthetic gas such as partially oxidized gas obtained from crude oil, that contains $CO_2$ at a high partial pressure, e.g., 30% $CO_2$ at 40 atm., using an aqueous mixture containing methyldiethanolamine and monoethylmonoethanolamine.

German Patent Provisional Publication 1,542,415 unveils in its published specification a technique of adding a monoalkylalkanolamine or the like to a physical or chemical absorbent so as to enhance the rates of absorption of $CO_2$, $H_2S$, and COS. Similarly, German Patent Provisional Publication 1,904,428 makes public a technique of adding monomethylethanolamine to methyldiethanolamine to increase the latter's absorption rate.

U.S. Pat. No. 336,233 discloses a technique using an aqueous solution of 0.81–1.3 mole piperazine per liter as a scrubbing solution for the purification of natural, synthetic, or gasified coal gas. Alternatively, piperazine in the form of an aqueous solution with a solvent such as methyldiethanolamine, triethanolamine, diethanolamine, or monomethylethanolamine is used as well for the scrubbing purpose.

Japanese Patent Provisional Publication No. 63171/1977 introduces a $CO_2$ absorbent prepared by adding piperazine or a piperazine derivative such as hydroxyethylpiperazine as a promoter to a tertiary alkanolamine, monoalkylalkanolamine or the like. In reality, the combination of piperazine and monomethylaminoethanolamine as a monoalkylalkanolamine is not tested. The disclosure is directed to the treatment of synthetic gas; it is utterly silent on the removal of $CO_2$ from combustion gases at atmospheric pressures.

In view of the state of the art described above, there is a demand for a process whereby $CO_2$ can be efficiently removed from various gases. For, especially when a gas is to be treated with an aqueous solution containing a given concentration of a $CO_2$ absorbent (amine compound), great significance is attached today to the choice of an absorbent which excels in both the $CO_2$ absorption quantity per unit mole of the absorbent and the $CO_2$ absorption quantity and absorption rate per unit volume of the aqueous solution. Also, the advent of an absorbent which consumes less thermal energy than heretofore in separating absorbed $CO_2$ and regenerating the liquid absorbent, is being awaited.

In some cases where a single amine compound can hardly meet all such desired conditions, it is likely that the discovery of a compound which can satisfy some of the needs can lead to an approach to greater satisfaction of the requirements, for example, through mixing with some other amine compound. Thus, only if the $CO_2$ absorption quantity per unit mole of the absorbent is high, there will be a possibility of achieving better result through an improvement of the absorption rate in a separate way.

SUMMARY OF THE INVENTION

The present invention encompasses four aspects depending upon the types of absorbent used. The first aspect of the invention will now be described.

The first aspect of the invention is based on the discovery that among the absorbents for use in removing $CO_2$ from gases, the aqueous solution of a specific amine compound shows a high degree of $CO_2$ absorption. Thus, in the first aspect of the invention, a process for removing $CO_2$ from gases is provided which is characterized by the contact of an untreated gas with an aqueous solution of an amine compound represented by the general formula [1]

$$R^1NHC(CH_3)_2CH_2OH \qquad [1]$$

in which $R^1$ is a lower alkyl group having 1–4 carbon atoms.

In the first aspect of the invention, the process for $CO_2$ removal is provided in varied forms, that is, using an amine compound in which $R^1$ of the formula is an isopropyl group, using an aqueous solution of an amine compound of the general formula [1] at a concentration in the range of 15–65% by weight, or treating a gas which is a combustion gas at the atmospheric pressure.

In an amine compound of the general formula [1] to be used in the first aspect of the invention, the lower alkyl group having 1–4 carbon atoms that is represented by $R^1$ is, e.g., methyl, ethyl, n-propyl, isopropyl, n-butyl, isobutyl, sec-butyl, or tert-butyl. Above all, an alkyl group having 1–3 carbon atoms is desirable because of the ease with which the compound is prepared and also in view of the $CO_2$ absorption capacity and water solubility.

Examples of the amine compounds represented by the general formula [1] are 2-methylamino-2-methyl-1-propanol, 2-ethylamino-2-methyl-1-propanol, 2-propylamino-2-methyl-1-propanol, 2-isopropylamino-2-methyl-1-propanol, 2-n-butyl-amino-2-methyl-1-propanol, 2-isobutylamino-2-methyl-1-propanol, 2-sec-butylamino-2-methyl-1-propanol, and 2-tert-butylamino-2-methyl-1-propanol. Of these, 2-isopropyl-amino-2-methyl-1-propanol is preferred.

The amine compounds of the general formula [1] may be used either singly or as a mixture of two or more.

The aqueous solution of the amine compound (hereinafter to be also called "the liquid absorbent") for use in contact with the gas in the first aspect of the invention usually has a concentration of 15–65% by weight, preferably 30–50% by weight. The temperature of the liquid absorbent during the contact with the gas is usually in the range of 30°–70° C.

The liquid absorbent for use in the first aspect of the invention may contain a corrosion preventive, anti-oxidant, or/and other additives, according to the necessity. It is also possible to mix an amine compound of the general formula [1] with another amine compound or compounds so as to enhance the absorption performance, including the $CO_2$ absorption quantity and absorption rate, of the liquid absorbent. Among such other amine compounds are 2-methylaminoethanol, 2-ethylaminoethanol, 2-isopro-pylaminoethanol, 2-n-butylaminoethanol, piperazine, 2-methylpiperazine, 2,5-dimethylpiperazine, piperidine, and 2-piperidineethanol. When such an amine compound or compounds are used, its or their concentration is usually in the range of 1.5–50% by weight, preferably in the range of 5–40% by weight, so long as such other compounds are soluble in water together with the amine compound of the general formula [1].

The gases to be treated in the first aspect of the invention include natural gas, synthetic gas and various other industrial gases produced by chemical plants and also the gases as combustion products. The invention is desirably applicable to gases at the atmospheric pressure, most desirably to combustion gases at the atmospheric pressure. For the purposes of the invention the term "atmospheric pressure" is used to cover the pressure range around the atmospheric pressure in which the blower and the like to feed the gas can be operated.

According to the first aspect of the present invention, contacting an untreated gas with an aqueous solution of an amine compound of the general formula [1] as a liquid absorbent allows more $CO_2$ to be absorbed per unit molar amount of the absorbent compound than with an aqueous MEA solution or the like that is commonly used as the liquid absorbent. An amine compound of the general formula [1], as judged from its molecular structure, has greater amino group hindrance than MEA and AMP and is presumed to call for less regenerative thermal energy for heating the liquid absorbent after the $CO_2$ absorption. It thus promises a process that generally economizes on the energy needed for the $CO_2$ recovery.

Next, the second aspect of the present invention will be described.

The second aspect of the invention is based upon the discovery that the use of an aqueous solution containing both a specific amine compound and a piperazine compound as a liquid absorbent is markedly effective for the removal of $CO_2$ from combustion gases.

In accordance with the second aspect of the invention, a process for removing $CO_2$ from combustion gases is provided which is characterized by contacting a combustion gas at the atmospheric pressure with an aqueous solution containing both an amine compound [2] represented by the general formula $$R^2CHR^3NHCH_2CH_2OH \qquad [2]$$

in which $R^2$ is a hydrogen atom or a lower alkyl group having 1–4 carbon atoms and $R^3$ is a hydrogen atom or a methyl group and a piperazine compound [3] selected from the group consisting of piperazine, 2-methylpiperazine, 2,3-dimethylpiperazine, and 2,5-dimethylpiperazine.

According to the second aspect of the invention, a process for $CO_2$ removal is provided wherein the piperazine compound [3] is 2-methylpiperazine and the amine compound [2] is 2-(n-butylamino)ethanol.

Further, in the second aspect of the invention, a process for $CO_2$ removal is provided which is characterized in that the concentration of the amine compound [2] in the aqueous solution is in the range of 15–65% by weight and the concentration of the piperazine compound [3] is in the range of 1.5–65% by weight where that piperazine compound is soluble in the aqueous solution of the amine compound [2] at 30° C., the combined concentration of [2] and [3] being not more than 70% by weight.

The second aspect of the invention resides in a process for removing $CO_2$ from combustion gases with an aqueous solution containing both a specific amine compound [2] and a piperazine compound [3]. As a liquid absorbent the aqueous solution containing the both compounds achieves by far the greater absorption performance than a liquid absorbent using either compound alone.

In an amine compound [2] of the above general formula for use in the second aspect of the invention, the lower alkyl group having 1–4 carbon atoms represented by $R^2$ is, e.g., methyl, ethyl, propyl, isopropyl, n-butyl, isobutyl, sec-butyl, or tert-butyl group. It is preferably methyl, ethyl, n-propyl, or n-butyl group, more preferably n-propyl group. $R^3$ is a hydrogen atom or methyl group, preferably hydrogen.

Examples of the amine compound [2] represented by the above general formula are 2-(methylamino)ethanol, 2-(ethylamino)ethanol [EAE], 2-(n-propylamino)ethanol, 2-(n-butylamino)ethanol [n-BAE], 2-(isopropylamino)ethanol, 2-(sec-butylamino)ethanol, and 2-(isobutylamino)ethanol. Particularly desirable is 2-(n-butylamino)ethanol [n-BAE]. Not only one but also two or more such amine compounds [2] may be used as a mixture.

The aqueous solution of an amine compound [2] and a piperazine compound [3] (hereinafter also called "the liquid absorbent") for contact with a combustion gas in the second aspect of the invention usually has an amine compound [2] concentration of 15–65% by weight, preferably 30–50% by weight.

The concentration of the piperazine compound [3] is usually in the range of 1.5–65% by weight. The concentration of the piperazine compound [3] in the liquid absorbent is desirably as high as possible. However, some piperazine compounds, e.g., piperazine, have such low degrees of solubility that they cannot be used at high concentrations. Thus, in consideration of the lowest possible temperature that a given liquid absorbent can be used in the whole process of absorption, the compound [3] is used within the above concentration range and also in the range where it is soluble in the aqueous solution of the amine compound [2] at 30° C.

In view of this, it is advisable that piperazine that has a relatively low solubility in water be used in the range of 1.5–15% by weight and other piperazine compounds be used in the range of 10–40% by weight, preferably 20–35% by weight. If the combined concentration of the amine compound [2] and the piperazine compound [3] is high, the viscosity increases accordingly. Because of this limiting factor, it is desirable that the two compounds be used at a combined concentration of not exceeding 70% by weight.

In the second aspect of the invention, the temperature of the liquid absorbent during contact with a combustion gas is usually in the range of 30°–70° C. Also, in the second aspect, the liquid absorbent may contain a corrosion preventive, antioxidant, or/and other additives as needed.

The term "atmospheric pressure" as used herein covers the pressure range around the atmospheric pressure in which the blower and the like to feed the gas can be operated.

The treatment of a combustion gas at the atmospheric pressure in conformity with the second aspect of the invention realizes a generally improved $CO_2$ removal capacity over the use of a conventional amine liquid absorbent.

The third aspect of the present invention will now be described.

The use of an aqueous solution of an alkanolamine typified by MEA or of a mixture of a hindered amine and an amine as a liquid absorbent for the removal of $CO_2$ from combustion gases has not always proved satisfactory. There is room for improvement in many respects, including the $CO_2$ absorption quantity per unit molar amount of amine in the aqueous amine solution, the rate of $CO_2$ absorption by the solution at a given concentration, and the thermal energy requirement for the regeneration of the aqueous alkanolamine solution after the $CO_2$ absorption.

Generally, secondary and tertiary hindered amines are superior to MEA in $CO_2$ absorption capacity and in regeneration of thermal energy but are yet to be improved in respect of the rate of absorption. An increase in the $CO_2$ absorption quantity per molar amount of the liquid absorbent and an increase in the $CO_2$ absorption per volume of the aqueous solution of an amine at a higher concentration are among the major problems that remain to be solved for enhanced absorption efficiency. A new liquid absorbent has been looked forward to which solves these problems and, moreover, consumes less thermal energy than heretofore in separating $CO_2$ and regenerating the liquid absorbent after the $CO_2$ absorption.

The third aspect of the present invention is based upon the discovery that the use of a mixed aqueous solution of a secondary amine and a tertiary amine at given or higher concentrations is remarkably effective as a liquid absorbent for the removal of $CO_2$ from combustion gases.

In the third aspect of the invention, a process for removing $CO_2$ from a combustion gas through the contact of the gas at the atmospheric pressure with an aqueous amine solution is provided which is characterized in that a mixed aqueous amine solution containing a secondary amine and a tertiary amine at concentrations of 10–45% by weight each is used as the aqueous amine solution.

The third aspect of the invention also provides a process for $CO_2$ removal from the gas wherein the concentration of the tertiary amine in the mixed aqueous amine solution is within the range of plus and minus 10% by weight of the concentration of the tertiary amine which, when used alone in an aqueous solution, achieves the maximum $CO_2$ absorption per unit volume of the singular solution, the absorption conditions being the same.

Also, in conformity with the third aspect, a $CO_2$ removal process is provided wherein the combined concentration of the amines in the mixed aqueous solution is not more than 70% by weight.

The third aspect provides a $CO_2$ removal process wherein the aqueous amine solution to be used is a mixed aqueous solution of a secondary amine selected from the group consisting of 2-methylaminoethanol, 2-ethylaminoethanol, 2-isopropylaminoethanol, 2-n-butylaminoethanol, piperazine, 2-methylpiperazine, 2,5-dimethylpiperazine, and 2-piperidinoethanol and a tertiary amine selected from the group consisting of 2-dimethylaminoethanol, 2-diethylaminoethanol, 3-dimethylamino-1-propanol, 4-dimethylamino-1-butanol, 2-dimethylamino-2-methyl-1-propanol, and N-ethyl-N-methylethanolamina.

The third aspect also provides a $CO_2$ removal process wherein the secondary and tertiary amines have one alcoholic hydroxyl group each.

According to the third aspect, a $CO_2$ removal process is provided wherein the aqueous amine solution to be used is a mixed aqueous solution of a secondary amine selected from the group consisting of 2-methylaminoethanol, 2-ethylaminoethanol, 2-isopropylaminoethanol, 2-n-butylaminoethanol, piperazine, 2-methylpiperazine, 2,5-dimethylpiperazine, and 2-piperidinoethanol and a tertiary amine selected from the group consisting of N-methyldiethanolamine, N-ethyldiethanolamine, N-t-butyldiethanolamine, and N-methyldiisopropanolamine.

Further, according to the third aspect, a $CO_2$ removal process is provided which uses a secondary amine selected from the group consisting of 2-methylaminoethanol, 2-ethylaminoethanol, 2-isopropylaminoethanol, and 2-n-butylaminoethanol.

In the third aspect of the present invention, an aqueous solution of a mixture of 10–45% by weight each of a secondary amine and a tertiary amine is used as a liquid absorbent. A tertiary amine attains a large $CO_2$ absorption quantity per unit molar amount but the rate of absorption is low. When it is used together with a secondary amine, the absorption rate is increased, and the combined use is markedly advantageous over individual use in respect of the absorption rate.

The absorption of $CO_2$ from a combustion gas is usually effected through a countercurrent contact between the liquid and the gas in an absorption tower. In a regeneration tower, the separation of $CO_2$ and regeneration of the liquid absorbent are carried out by steam stripping. For the process the relation between the $CO_2$ saturation absorption quantity per unit molar amount of the amine in the liquid absorbent at a given temperature (X-axis) and the $CO_2$ partial pressure in the gas (Y-axis), i.e., the equilibrium curve, is obtained with each amine under the individual temperature and $CO_2$ partial pressure conditions in the absorption tower and the regeneration tower. The possibility of setting operating lines that represent the actual operating conditions apart from, and in parallel with, the equilibrium curves is beneficial since it facilitates fixing of the number of theoretical plates.

The equilibrium curve of a tertiary amine is less inclined than that of a secondary amine. This means that the tertiary amine has a greater absorption capacity but is less favorable in its relation to the operating line than the secondary amine is.

Mixing the two amines allows the equilibrium curve of the mixed aqueous amine solution to shift in between the secondary and tertiary amines. This makes it easy to set the conditions for absorption operation to an advantage.

It has now been found that if the concentration of a tertiary amine in its aqueous solution is continuously increased in absorbing $CO_2$ from a gas such as combustion gas wherein the partial pressure of $CO_2$ is low, there is a concentration level where the $CO_2$ absorption reaches a maximum (the maximum $CO_2$ absorption concentration), beyond which the absorption quantity begins to dwindle. The amine concentration at that point is approximately 30% by weight, although it varies more or less with amines.

With a secondary amine, by contrast, the higher the concentration and larger the $CO_2$ absorption quantity. Meanwhile, the increase in viscosity, gas-liquid contact condition, fluidity, and other factors naturally place an upper limit on the concentration of the liquid absorbent. In view of the foregoing, it is advisable to set the concentration of a tertiary amine to the neighborhood of the maximum $CO_2$ absorption concentration, and add a secondary amine at a concentration in the range up to the above upper limit. In this way an increase in the concentration is attained by the mixing of the two amines and the absorption capacities of the two are displayed to the fullest extent.

In the third aspect of the invention, the secondary and tertiary amines to be used combinedly as a liquid absorbent may or may not have an alcoholic hydroxyl group each in the molecule. Either may be acyclic or cyclic, but the tertiary amine is preferably acyclic.

Desirable secondary amines for the third aspect of the invention are acyclic amines, such as 2-methylaminoethanol, 2-ethylaminoethanol, 2-isopropylaminoethanol, and 2-n-butylaminoethanol, and cyclic amines, such as piperazine, 2-methylpiperazine (MP), 2,5-dimethylpiperazine, and 2-piperidinoethanol. The secondary amines may be used singly or as a mixture of two or more.

Desirable tertiary amines include those having one alcoholic hydroxyl group in the molecule, such as 2-dimethylaminoethanol, 2-diethylaminoethanol, 3-dimethylamino-1-propanol, 4-dimethylamino-1-butanol, 2-dimethylamino-2-methyl-1-propanol, and N-ethyl-N-methylethanolamine.

Those having two alcoholic hydroxyl groups are, e.g., N-methyldiethanolamine, N-ethyldiethanolamine, N-t-butyldiethanolamine, and N-methyldiisopropanolamine. When a tertiary amine having two alcoholic hydroxyl groups is to be employed, it is desirable to combine it with a secondary amine at a higher concentration, e.g., at least 15% by weight. Even a higher concentration of 30% by weight or above is more desirable.

The tertiary amines too may be used singly or as a mixture of two or more.

In the third aspect of the invention, the mixed aqueous solution of secondary and tertiary amines (hereinafter also called "the liquid absorbent") for use in contact with a combustion gas is at a concentration such that each amine amount is in the range of 10–45% by weight.

The concentration of the tertiary amine is in the range plus and minus 10% by weight, preferably plus and minus 5% by weight, relative to the maximum $CO_2$ absorption concentration of the particular tertiary amine. Thus, the desirable concentration range of the tertiary amine is about 20–40% by weight.

On the other hand, as noted above, a secondary amine usually shows a gradual increase in the saturation absorption quantity as its concentration rises. For this reason a high concentration is desirable, but the combined concentration including the concentration of a tertiary amine should be kept not greater than 70% by weight from the viewpoint of gas-liquid contact property and fluidity. A particularly desirable concentration range for a secondary amine is about 15–20% by weight.

In the third aspect of the invention, the temperature of the liquid absorbent during contact with a combustion gas is usually in the range of 30°–70° C.

The liquid absorbent for use in the third aspect of the invention may contain a corrosion preventive, anti-oxidant, or/and other additives, when necessary.

The expression "at the atmospheric pressure" as used here implies the pressure range around the atmospheric in which the blower and the like for feeding a combustion gas can be operated.

The treatment of a combustion gas at the atmospheric pressure in accordance with the third aspect of the invention generally achieves a greater $CO_2$ removal capacity than when a conventional amine liquid absorbent is employed.

The fourth and last aspect of the present invention will now be described.

The fourth aspect of the invention is based upon the discovery that the use of a specific piperazine derivative for the liquid absorbent is remarkably effective for the removal of $CO_2$ from combustion gases.

The fourth aspect of the invention relates to a process for removing $CO_2$ from combustion gases which comprises contacting a combustion gas at the atmospheric pressure with an aqueous solution of a piperazine derivative represented by the general formula [4]

[4]

in which $R^4$ is a lower alkyl group and $R^5$ is a hydrogen atom or a lower alkyl group.

The fourth aspect of the invention is also concerned with a process for removing $CO_2$ from combustion gases wherein the piperazine derivative is 2-methylpiperazine. It further concerns a $CO_2$ removal process wherein the concentration of the aqueous solution is in the range of 15–65% by weight. The invention will be more fully described below.

In a piperazine derivative of the general formula [4] for use in the fourth aspect of the invention, the lower alkyl groups represented by $R^4$ and $R^5$ are preferably methyl, ethyl, propyl and the like having 1–3 carbon atoms, more preferably methyl groups. Examples of the compounds are 2-methylpiperazine, 2-ethylpiperazine, 2-propylpiperazine, 2,5-dimethylpiperazine, 2-methyl-5-ethylpiperazine, and 2,5-diethylpiperazine. Among these, 2-methylpiperazine and 2,5-dimethylpiperazine are preferred. The piperazine derivatives represented by the general formula [4] may be used singly or in a combination of two or more.

The aqueous solution of the piperazine derivative (hereinafter also called "the liquid absorbent") to be used for contact with a combustion gas in the fourth aspect of the invention usually has a concentration of 15–65% by weight, preferably 30–50% by weight. The temperature of the liquid absorbent during contact with the combustion gas is usually 30°–70° C. The liquid absorbent for use in the fourth aspect may contain a corrosion preventive, anti-oxidant, and the like as needed. The expression "at the atmospheric pressure" as used herein covers the pressure range around the atmospheric in which the blower and the like for feeding the combustion gas can be operated.

The use of an aqueous solution of a piperazine derivative as a liquid absorbent for a combustion gas at the atmospheric pressure in the process according to the fourth aspect of the invention generally achieves an improvement in $CO_2$ absorption capacity over the use of a conventional aqueous MEA solution.

DETAILED DESCRIPTION OF THE PREFERRED EMBODIMENTS

The present invention will now be explained as applied to the treatment of combustion gases.

The flow chart of the process equipment that may be employed for the removal of $CO_2$ from combustion gases in accordance with the invention is not specially limited. One example will be explained below with reference to FIG. 1. Major components of the equipment are shown but auxiliary facilities are not shown.

Figure 1:
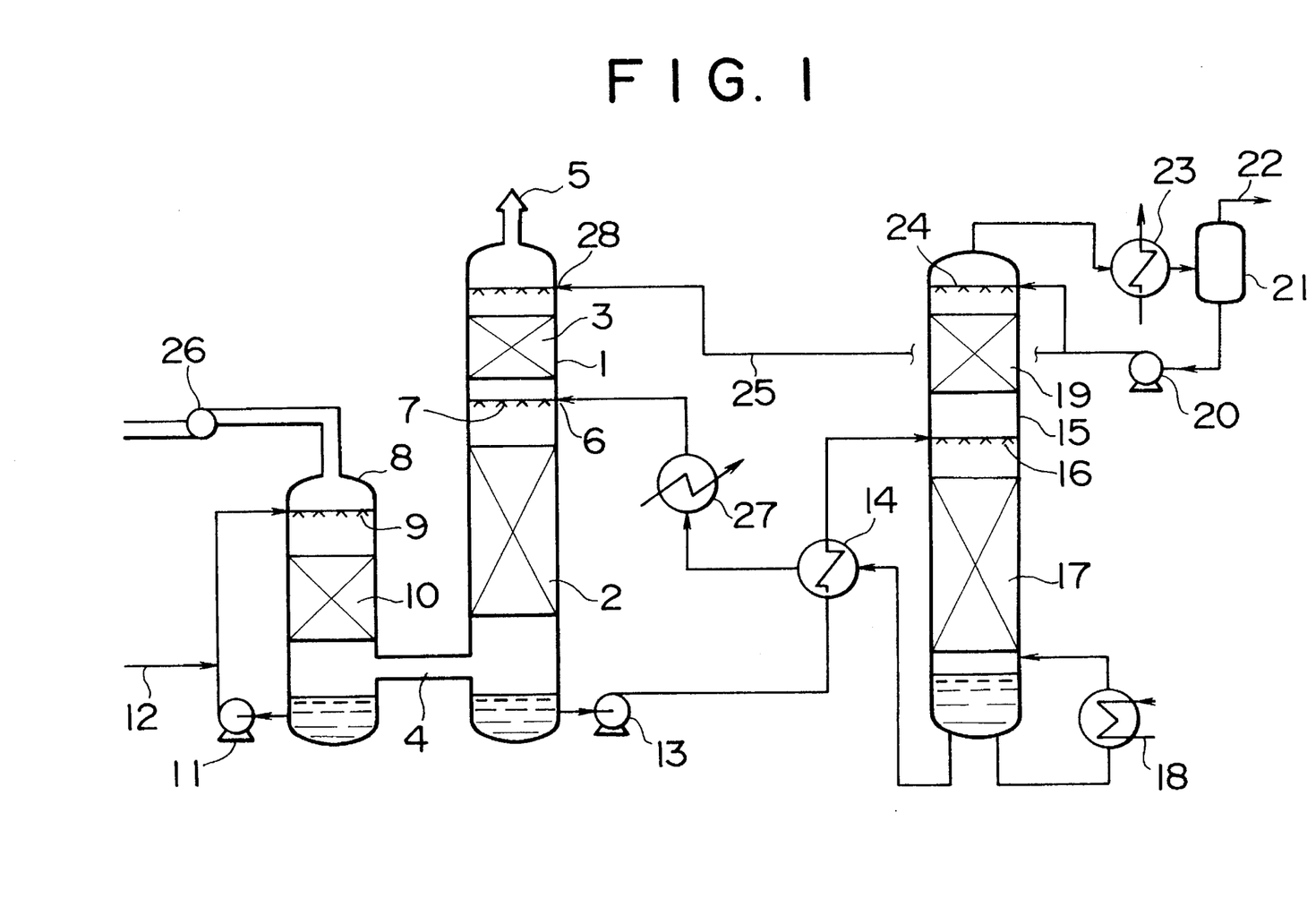
FIG. 1 is a flow chart of a process for the removal of $CO_2$ from combustion gases as an embodiment of the present invention.

Referring to FIG. 1, numeral 1 designates a $CO_2$-removal tower; 2, a lower packing section; 3, an upper packing section or tray; 4, a combustion-gas inlet of the $CO_2$-removal tower; 5, a $CO_2$-free combustion-gas outlet; 6, a liquid absorbent inlet; 7, nozzles; 8, a combustion-gas cooler provided when necessary; 9, nozzles; 10, a packing section; 11, a circulating pump for moistening-cooling water; 12, a makeup feed line; 13, a pump for draining the liquid absorbent that has absorbed $CO_2$; 14, a heat exchanger; 15, a liquid absorbent regeneration tower (hereinafter also called a "regeneration tower" for brevity); 16, nozzles; 17, a lower packing section; 18, regeneration heater (reboiler); 19, an upper packing section; 20, a reflux water pump; 21, a $CO_2$ separator; 22, a recovered $CO_2$ discharge line; 23, a reflux cooler for the regeneration tower; 24, nozzles; 25, a reflux water feed line to the regeneration tower; 26, a combustion-gas feed blower; 27, a cooler; and 28, a feed port for reflux water from the regeneration tower.

As indicated in FIG. 1, a combustion gas is forced by combustion-gas feed blower 26 into combustion-gas cooler 8, where, in packing section 10, it comes in contact with moistening-cooling water from nozzles 9. Moistened and cooled, the gas is then led through combustion-gas inlet 4 to $CO_2$-removal tower 1. Meanwhile, the moistening-cooling water after the contact with the combustion gas collects at the bottom of combustion-gas cooler 8, from which it is recycled by pump 11 to nozzles 9. Since it is gradually lost by moistening and cooling the combustion gas, the moistening-cooling water is replenished by makeup feed line 12. When the combustion gas in the moistened and cooled state is to be further cooled, it is possible to install a heat exchanger between moistening-cooling water circulating pump 11 and nozzles 9 and cool the moistening-cooling water to a lower temperature before supply to combustion-gas cooler 8.

The combustion gas forced into $CO_2$-removal tower 1 enters lower packing section 2, where it is brought into countercurrent contact with the liquid absorbent being supplied at a given concentration from nozzles 7. $CO_2$ is taken up by the liquid absorbent from the combustion gas, and the $CO_2$-free combustion gas flows upward to upper packing section 3. The liquid absorbent supplied to $CO_2$-removal tower 1 absorbs $CO_2$, and the heat of reaction due to absorption makes it usually hotter than at liquid absorbent inlet 6. The liquid absorbent after the $CO_2$ absorption is then sent by discharge pump 13 to heat exchanger 14, where it is additionally heated, and is conducted to liquid absorbent regeneration tower 15. The temperature control of the regenerated liquid absorbent can be done by heat exchanger 14 or by cooler 27 that is provided between heat exchanger 14 and liquid absorbent inlet 6.

In regeneration tower 15, the liquid absorbent is regenerated in lower packing section 17 with heat from regeneration heater 18. It is then cooled by heat exchanger 14 and, where necessary, by cooler 27 that is installed between heat exchanger 14 and liquid absorbent inlet 6, and returned to $CO_2$-removal tower 1. In the upper space of liquid absorbent regeneration tower 15, the $CO_2$ separated from the liquid absorbent comes in contact with the reflux water supplied by nozzles 24. Following this, it is cooled by regeneration tower reflux cooler 23, and enters $CO_2$ separator 21, where it is separated to reflux water that has resulted from the condensation of water vapor that had accompanied $CO_2$. Finally it is conducted by recovered $CO_2$ discharge line 22 to a $CO_2$ recovery step. Part of the reflux water is returned by reflux water pump 20 to regeneration tower 15 through nozzles 24, while the remainder is supplied through regeneration-tank reflux water feed line 25 to the regeneration-tower reflux water inlet 28 of $CO_2$-removal tower 1. The reflux water from the regeneration tower contains a slight amount of the liquid absorbent, which contributes to the removal of the slight $CO_2$ content in the combustion gas with which the reflux water comes in contact in the upper packing section 3 of $CO_2$-removal tower 1.

The present invention will now be concretely explained in connection with its examples which are in no way limitative and also with comparative and reference examples.

EXAMPLE 1 AND COMPARATIVE EXAMPLE 1-2

The first aspect of the present invention will be illustrated by examples in which the $CO_2$ absorption capacity of an amine compound of the general formula [1] adopted in the first aspect was evaluated in small-scale absorption tests.

Into a glass reaction vessel held in a thermostatic chamber was placed 50 ml of an aqueous solution containing 30% by weight of 2-isopropylamino-2-methyl-1-propanol (IPAMP), a compound of the general formula [1] in which $R^1$ is an isopropyl group. With stirring at 40° C., $CO_2$ gas was passed through the liquid absorbent at the atmospheric pressure at a rate of one liter per minute, through a filter so that bubbles can easily form. One hour later, the $CO_2$ content in the liquid absorbent was measured using a $CO_2$ analyzer (total organic carbon meter), and the absorption quantity (mol.$CO_2$/mol.absorbent) was found. Similar absorption tests were conducted with aqueous solutions of MEA and AMP, respectively, as Comparative Examples 1 and 2. The results are shown in Table 1.

TABLE 1

| | Absorbent | mol $CO_2$/ mol absorbent |
|---|---|---|
| Example 1 | IPAMP | 1.00 |
| Comp. Ex. 1 | MEA | 0.58 |
| Comp. Ex. 2 | AMP | 0.86 |

As is obvious from Table 1, the use of the aqueous solution of 2-isopropylamino-2-methyl-1-propanol (IPAMP), an amine compound for use in the first aspect of the invention, as a liquid absorbent shows a greater $CO_2$ absorption quantity per mole than the aqueous solutions of MEA and AMP.

EXAMPLE 2-4 AND COMPARATIVE EXAMPLE 3-6

Figure 2:
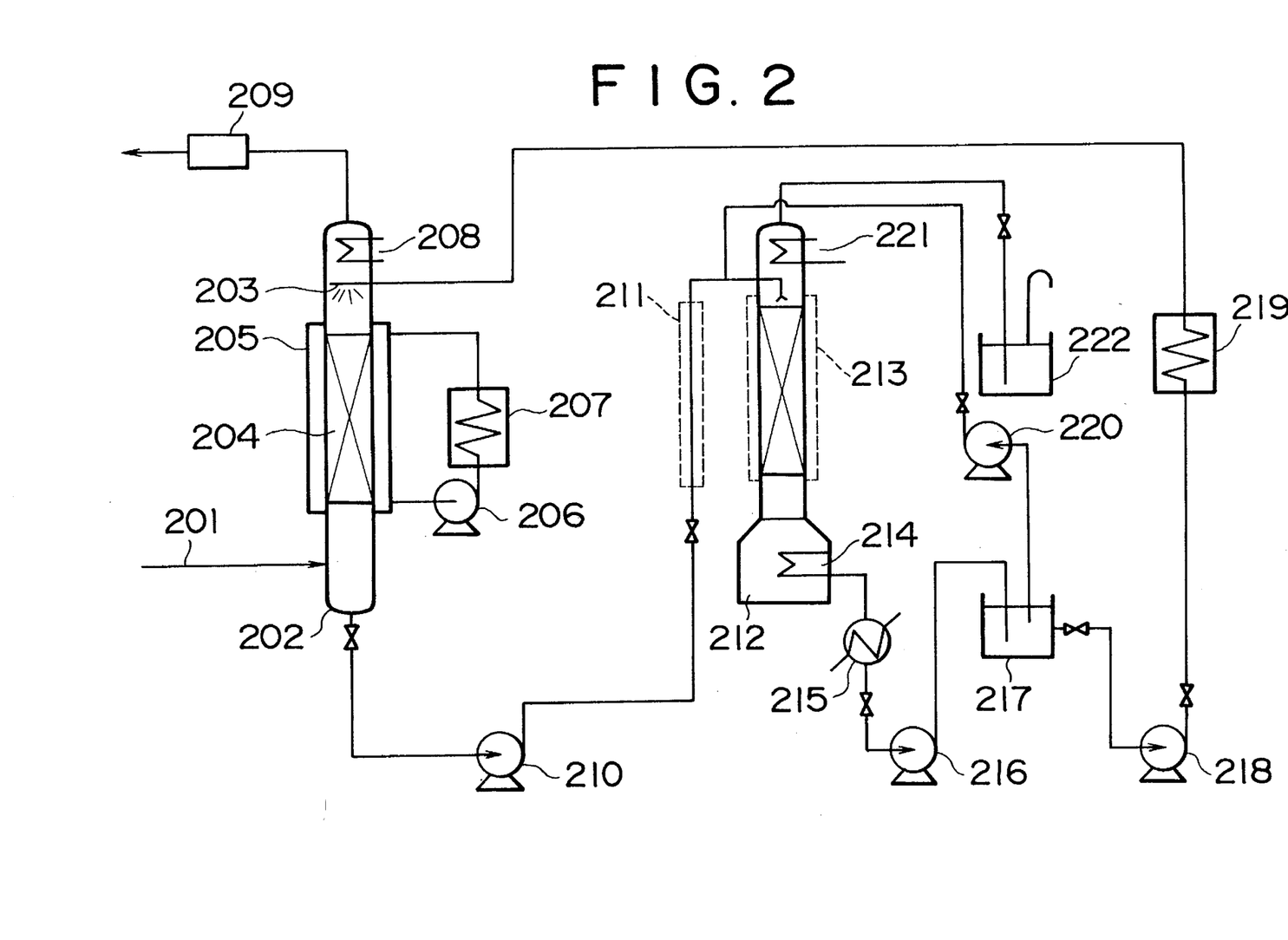
FIG. 2 is a schematic view of a small-scale testing equipment used in connection with the embodiment of the invention.

In order to confirm the effects of the process for $CO_2$ removal from combustion gases in accordance with the second aspect of the present invention, a small-scale testing equipment schematically illustrated in FIG. 2 was used.

As shown in FIG. 2, a test gas 201 is introduced, at a flow rate of 0.98 $Nm^3/h$, to the lower part of a stainless steel absorption tower 202, which measures 1500 mm high and 50 mm in inside diameter and accommodates a packing section 1000 mm high. The test gas composition is adjusted to 10% $CO_2$, 87% $N_2$, and 3% $O_2$. Absorption tower 202 has nozzles 203 in the upper part from which a regenerated and recycled liquid absorbent is sprayed out. A packing section 204 held in the middle part of the absorption tower is packed with Dickson packings 6 mm long. That section is surrounded by a hot water jacket 205 and is equipped with a hot water circulating pump 206 and a hot water tank 207 to maintain an absorption temperature of 60° C. In the upper part of absorption tower 202 is installed an absorption tower condenser 208, where absorption-treated gas is cooled and then analyzed by an absorption-treated gas analyzer 209 and finally discharged from the system. Below the absorption tower is located a liquid absorbent drain pump 210. The liquid absorbent is heated by a preheating heater 211 and kept at 110° C. and then introduced into the upper space of a regeneration tower 212. Regeneration tower 212 is built of stainless steel and is 1500 mm high and 25 mm in inside diameter. A packing section in the middle part of the tower is 160 mm high and is packed with the same packings as used in the absorption tower. The packing section is provided with a hot water jacket 213 to keep its temperature same and constant as in the absorption tower. A $CO_2$-rich liquid absorbent that flow down from the top of the packing section in regeneration tower 212 is heated by a reboiler heater (electrically heated) 214 in the lower part (the reboiler temperature being controlled at 110° C.) and is stripped with the resulting steam to be a $CO_2$-lean liquid absorbent. This lean liquid absorbent is led through a regenerated liquid absorbent cooler 215, a regenerated liquid absorbent drain pump 216, a regenerated liquid absorbent tank 217, a regenerated liquid absorbent circulating pump 218, and a regenerated liquid absorbent preheater 219 and then is recycled to the upper part of the absorption tower at a flow rate of 2.8 l/h. Part of the lean liquid absorbent is returned to the inlet of the regeneration tower by a regenerated liquid absorbent pump 220. A regeneration tower condenser 221 is provided in the upper part of the regeneration tower. Condenser 221 condenses water vapor away from the $CO_2$ gas that has been separated from the liquid absorbent. The $CO_2$ gas is then analyzed by an infrared $CO_2$ gas meter (Model "VIA-510" mfd. by Horiba Seisakusho) not shown and is discharged by way of a regeneration tower gas scrubber 222.

Absorption and regeneration tests were conducted with the afore-described small-scale testing equipment and absorption-regeneration conditions, using liquid absorbents containing the compounds mentioned in Table 2. The $CO_2$ concentrations in the inlet gas (test gas) and in the outlet gas (absorption-treated gas) of the absorption tower, heat input to the reboiler (in kW), $CO_2$ concentrations in rich and lean liquid absorbents (as measured with the "total organic carbon meter" Model TOC-5000 mfd. by Shimadzu Corp.), and quantities of regenerated heat were determined. The results are summarized in Table 2.

TABLE 2

| Example | Liquid absorbent (wt %) | Gas feed rate (Nm³/h) | CO₂ conc. in absorption tower (%) | | Reboiler heat input (kW) | CO₂ conc. in liquid absorbent | | Qty. of regen. heat*¹ (kcal/kg CO₂) |
|---|---|---|---|---|---|---|---|---|
| | | | Inlet | Outlet | | Rich (Nm³ CO₂/m³) | Lean (Nm³ CO₂/m³) | |
| 2 | n-BAE 30 MP 15 | 0.98 | 9.65 | 0.50 | 0.28 | 41.1 | 10.3 | 1360 |
| 3 | EAB 30 MP 3 | 0.98 | 9.64 | 2.97 | 0.28 | 47.9 | 19.2 | 1817 |
| Comp. 3 | MP 30 | 0.98 | 9.66 | 3.43 | 0.28 | 41.5 | 17.2 | 1940 |

*¹Based on the combustion gas calculated from the CO₂ concentration in the gas being discharged, the values being inclusive of the heat dissipated by the equipment.

Further tests were done with changes in the reboiler heat input, and the reboiler heat input values and the quantities of $CO_2$ recovered per unit time were determined when they became stabilized. The results are shown in Table 3. As compared with the quantities of regenerated heat in Table 2 that included the quantities of heat dissipated by the equipment, the quantities given in Table 3 exclude the dissipated heat.

TABLE 3

| Example | Liquid absorbent (wt %) | Gas feed rate (Nm³/h) | CO₂ conc. in absorption tower (%) | | Reboiler heat input (kW) | CO₂ conc. in liquid absorbent | | Qty. of regen. heat*² (kcal/kg CO₂) |
|---|---|---|---|---|---|---|---|---|
| | | | Inlet | Outlet | | Rich (Nm³ CO₂/m³) | Lean (Nm³ CO₂/m³) | |
| 4 | BAE 30 MP 3 | 0.47 | 9.63 | 3.92 | 0.20 | 46.7 | 22.4 | 750 |
| Comp. 4 | MP 30 | 0.47 | 9.61 | 5.12 | 0.20 | 35.0 | 9.0 | 939 |
| Comp. 5 | n-BAE 30 | 0.47 | 9.63 | 4.15 | 0.20 | 32.3 | 9.2 | 800 |
| Comp. 6 | MEA 30 | 0.47 | 9.66 | 5.32 | 0.20 | 52.4 | 38.7 | 975 |

*²Based on the combustion gas calculated from the CO₂ concentration in the gas being discharged, the values being exclusive of the heat dissipated by the equipment.

As can be seen from Tables 2 and 3, the use of a mixed liquid absorbent of an amine compound [2] and a piperazine compound [3] in conformity with the second aspect of the present invention is quite advantageous in that it achieves substantial improvements in absorption capacity and in regeneration of energy over the liquid absorbent of a conventional aqueous MEA solution or of the amine compound [2] or the piperazine compound [3] alone.

Next, the third aspect of the invention is illustrated by the following examples.

REFERENCE EXAMPLE 1-3

Reference Examples 1-3 are test examples performed with the view to finding the optimum amine concentrations under ordinary conditions.

Aqueous solutions of tertiary amines were varied in concentration as listed in Table 4, and 50 ml of each solution as a liquid absorbent was placed in a glass reaction vessel held inside a thermostatic chamber. A test gas was passed through the liquid absorbent at a flow rate of one liter per minute at the atmospheric pressure, with stirring at 40° C., via a filter to facilitate bubbling. The test gas used was a model combustion gas at 40° C. having a composition of 10 mol % $CO_2$, 3 mol % $O_2$, and 87 mol % $N_2$.

Each test gas was continuously passed and at the point where the $CO_2$ concentrations at the inlet and outlet became equal, the $CO_2$ content in the liquid absorbent was measured using a $CO_2$ analyzer (total organic carbon meter), and the quantity of saturation absorption of $CO_2$ ($Nm^3$ $CO_2/m^3$ liquid absorbent, $CO_2$/absorbent both in terms of the numbers of moles) was determined. The test results are shown in Table 4.

TABLE 4

| | Liquid absorbent (wt %) | | Qty. of saturation absorption of CO₂ | |
|---|---|---|---|---|
| | | | CO₂ mol/ amine mol | Nm³ CO₂/m³ liquid absorbent |
| Ref. Ex. 1 | DMAE | 0 | — | — |
| | | 30 | 0.55 | 41.7 |
| | | 40 | 0.35 | 35.3 |
| | | 50 | 0.23 | 29.0 |
| | | 60 | 0.13 | 19.2 |
| Ref. Ex. 2 | DEAE | 0 | — | — |
| | | 30 | 0.75 | 42.2 |
| | | 40 | 0.52 | 40.0 |
| | | 50 | 0.29 | 27.3 |
| | | 60 | 0.17 | 19.0 |
| Ref. Ex. 3 | MDEA | 0 | — | — |
| | | 30 | 0.29 | 16.5 |
| | | 60 | 0.09 | 10.1 |

As Table 4 indicates, the tertiary amines used in the third aspect of the invention have their own $CO_2$ absorption capacities such that their maximum $CO_2$ absorption concentrations in the liquid absorbents are always around 30% by weight.

REFERENCE EXAMPLE 4–18

Reference Example 4–18 are test examples intended to determine the quantities of the $CO_2$ absorption of various secondary and tertiary amines at a concentration of 30% by weight each, under ordinary conditions.

The procedure of Reference Example 1 was repeated to perform a $CO_2$ absorption test of the secondary and tertiary amines listed in Table 5, at a concentration of 30% by weight each. Table 5 gives the results.

treated gas) of the absorption tower in Table 6, heat input to the reboiler (in kW), $CO_2$ concentrations in rich and lean liquid absorbents (measured with the "total organic carbon meter" Model TOC-5000 mfd. by Shimadzu Corp.), and quantities of regenerated heat were determined. The results are given in Table 6.

TABLE 6

| Example | Liquid absorbent (wt %) | Absorption tower $CO_2$ conc. Inlet (%) | Absorption tower $CO_2$ conc. Outlet (%) | Reboiler heat input (kW) | Absorption tower $CO_2$ conc. Rich ($Nm^3$ $CO_2/m^3$) | Absorption tower $CO_2$ conc. Lean ($Nm^3$ $CO_2/m^3$) | Qty. of regen heat* (kcal/kg $CO_2$) |
|---|---|---|---|---|---|---|---|
| 5 | DMAE 30 MP 15 | 9.67 | 2.60 | 0.28 | 32.0 | 8.2 | 1727 |
| Comp. 7 | DMAE 30 | 9.66 | 7.51 | 0.28 | 11.5 | 2.4 | 5376 |
| Comp. 8 | DMAE 30 piperazine 3 | 9.68 | 3.93 | 0.28 | 35.4 | 4.0 | 2471 |
| 6 | MDEA 30 MP 15 | 9.69 | 4.32 | 0.28 | 24.8 | 5.0 | 2238 |
| 7 | MDEA 30 MAE 30 | 9.65 | 2.89 | 0.28 | 43.6 | 16.0 | 1796 |
| 8 | MDEA 30 EAE 30 | 9.65 | 2.53 | 0.28 | 33.0 | 6.1 | 1713 |
| Comp. 9 | MDEA 30 MP 3 | 9.65 | 6.13 | 0.28 | 15.2 | 1.8 | 3336 |
| 9 | DEAE 30 MP 15 | 9.65 | 1.38 | 0.28 | 37.0 | 6.8 | 1491 |
| Comp. 10 | MEA 30 | 9.65 | 3.60 | 0.28 | 48.5 | 25.6 | 1993 |

*On the basis of the combustion gas, the value being inclusive of the heat loss involved.

TABLE 5

| | Liquid absorbent | Qty. of $CO_2$ saturation absorption $CO_2$ mol/ amine mol | Qty. of $CO_2$ saturation absorption $Nm^3$ $CO_2/m^3$ liquid absorbent |
|---|---|---|---|
| Ref. Ex. 4 | MAE | 0.63 | 56.2 |
| Ref. Ex. 5 | EAE | 0.68 | 51.3 |
| Ref. Ex. 6 | IPAE | 0.73 | 47.3 |
| Ref. Ex. 7 | BEA | 0.63 | 35.8 |
| Ref. Ex. 8 | Piperazine (conc. 15 wt %) | 0.84 | 32.8 |
| Ref. Ex. 9 | MP | 0.81 | 54.3 |
| Ref. Ex. 10 | DMP | 0.74 | 21.9 |
| Ref. Ex. 11 | PE | 0.84 | 43.9 |
| Ref. Ex. 12 | DMAP | 0.60 | 39.4 |
| Ref. Ex. 13 | DMAB | 0.73 | 42.1 |
| Ref. Ex. 14 | DMAMP | 0.80 | 46.1 |
| Ref. Ex. 15 | EMEA | 0.61 | 39.6 |
| Ref. Ex. 17 | BDA | 0.44 | 18.1 |
| Ref. Ex. 18 | MDPA | 0.32 | 14.7 |

EXAMPLE 5–9 & COMPARATIVE EXAMPLE 7–10

In order to confirm the effects of the process for removing $CO_2$ from combustion gases in accordance with the third aspect of the invention, the small-scale testing equipment schematically illustrated in FIG. 2 was used.

Absorption and regeneration tests were carried out with the above small-scale testing equipment and under the afore-said absorption and regeneration conditions, using the liquid absorbents listed in Table 6. The $CO_2$ concentrations in the inlet gas (test gas) and the outlet gas (absorption- As will be appreciated from Table 6, the use of a mixed liquid absorbent of secondary and tertiary amines according to the third aspect of the invention is very advantageous in that it brings marked improvements in absorption capacity and regeneration of energy.

The fourth aspect of the present invention is illustrated by the following examples.

EXAMPLE 10, COMPARATIVE EXAMPLE 11

Fifty milliliters of an aqueous solution of 30 wt % 2-methylpiperazine was placed in a glass reaction vessel held in a thermostatic chamber. With stirring at 40° C., a test gas was passed through this liquid absorbent at the atmospheric pressure and at a flow rate of one liter per minute, by way of a filter to facilitate bubbling. As for the test gas, a model combustion gas at 40° C. with a composition of 10 mol % $CO_2$, 3 mol % $O_2$, and 87 mol % $N_2$ was used.

The test gas was continuously passed until the $CO_2$ concentrations at the inlet and outlet became equal, when the $CO_2$ content in the liquid absorbent was measured using a $CO_2$ analyzer (total organic carbon meter), and then the quantity of saturation absorption of $CO_2$ by the liquid absorbent ($Nm^3$ $CO_2/m^3$ solution, mol $CO_2$/mol liquid absorbent) was determined. Also, as a measure of the average absorption rate up to the saturation, the time required for attaining 90% saturation absorption and the average absorption rate during the period were found.

In addition, the $CO_2$ concentration in the gas at the outlet of the reaction vessel at early stage of the absorption test (initial outlet gas $CO_2$ concentration) was determined. It can generally be said that the lower the initial $CO_2$ concentration at the outlet the higher the $CO_2$ absorption rate of the liquid absorbent. Further, the outlet $CO_2$ concentration at early stage was followed to obtain the initial absorption rate, and the rate was compared with that of the aqueous MEA solution to be mentioned later (initial absorption rate ratio).

As Comparative Example 11, an absorption test with an aqueous MEA solution was conducted. The results of the two tests are summarized in Table 7.

It was confirmed that the mixed solution after the absorption could be smoothly regenerated by heating.

TABLE 7

| Example | Liquid absorbent | $CO_2$ saturation absorption | | Time required for 90% saturation absorption & average absorption rate during the period | | Initial outlet gas | Initial absorption rate ratio |
|---|---|---|---|---|---|---|---|
| | | $CO_2$ mol/ absorbent mol | $Nm^3$ $CO_2/m^3$ liquid absorbent | Time (H) | $Nm^3$ $CO_2/m^3$ liquid absorbent/H | $CO_2$ concentration (%) | |
| Ex. 10 | 2-methylpiperazine | 0.81 | 54.2 | 0.65 | 75.1 | 0.0 | 1.01 |
| Comp. 11 | Monoethanolamine | 0.56 | 61.7 | 0.66 | 84.1 | 0.0 | 1.00 |

As Table 7 demonstrates, the aqueous solution of a piperazine derivative used as a liquid absorbent for a combustion gas in conformity with the fourth aspect of the invention is superior than an aqueous MEA solution in the saturation absorption of $CO_2$ per mole of the absorbent.

EXAMPLE 11 & COMPARATIVE EXAMPLE 12

In order to determine the quantities of thermal energy required for the regeneration of liquid absorbents, the quantities of heat of reaction (the quantity of heat generated by absorption) between $CO_2$ and the liquid absorbents (conc. 30 wt %) used in Example 10 and Comparative Example 11 were measured. 200 g of each liquid absorbent was placed in an adiabatic tester, stirred with a magnetic stirrer, and allowed to stand until the temperature of the liquid absorbent stabilized. Next, pure $CO_2$ was blown into the tester at a rate of about 200 cc/min, and the $CO_2$ flow rates at the inlet and outlet of the tester and the liquid absorbent temperature were continuously recorded. The test was concluded at the point of time when the $CO_2$ flow rate at the outlet of the tester abruptly increased.

The number of moles of $CO_2$ absorbed by each test liquid absorbent (molar load) and the quantities of heat of reaction (kcal/mole) for the absorption of each mole of $CO_2$ during the temperature rise from the beginning of $CO_2$ blowing were determined for individual absorbed $CO_2$ molar section. The heat capacity of the tester was determined from the temperature rise of 200 g of water placed in the tester and heated by a heater at 30 V and 0.3 A for a predetermined period of time. The testing temperature range was 20°–80° C. and the room temperature at the time of measurements was 20°–25° C. The results are shown in Table 8.

TABLE 8

| Mole $CO_2$/ mole absorbent | Comp. Ex. 11 MEA (kcal/mole) | Example 10 2-methylpiperazine (kcal/mole) |
|---|---|---|
| 0–0.10 | 19.2 | 19.0 |
| 0.10–0.20 | 20.2 | 19.1 |
| 0.20–0.30 | 19.6 | 19.2 |
| 0.30–0.40 | 19.8 | 18.2 |
| 0.40–0.50 | 18.5 | 18.7 |
| 0.50–0.60 | | 16.1 |
| 0.60–0.70 | | 16.1 |
| 0.70–0.80 | | 14.6 |
| 0.80–0.84 | | 12.2 |

As is evident from Table 8, the heat of reaction between $CO_2$ and the 2-methylpiperazine liquid absorbent according to the fourth aspect of the present invention is less than that with the MEA-based liquid absorbent in the sections where the number of absorbed $CO_2$ moles is large. This means that the former requires less energy than MEA for the regeneration to an economic advantage.

What is claimed is:

1. A process for removing $CO_2$ from a $CO_2$-containing gas said process comprising contacting the $CO_2$-containing untreated gas with an aqueous solution of an amine compound represented by the general formula (1)

$$R^1NHC(CH_3)_2CH_2OH \qquad (1)$$

in which $R^1$ is an isopropyl group.

2. The process as claimed in claim 1 wherein the aqueous solution of the amine compound of the general formula (1) is in a concentration in the range of 15–65% by weight.

3. The process as claimed in claim 1 wherein the $CO_2$-containing gas is a combustion gas at atmospheric pressure.

4. A process for removing $CO_2$ from combustion gases said process comprising contacting a combustion gas at atmospheric pressure with an aqueous solution containing both an amine compound (2) represented by the general formula

$$R^2CHR^3NHCH_2CH_2OH \qquad (2)$$

in which $R^2$ is a hydrogen atom or a lower alkyl group having 1–4 carbon atoms and $R^3$ is a hydrogen atom or a methyl group and a piperazine compound (3) selected from the group consisting of piperazine, 2-methylpiperazine, 2,3-dimethylpiperazine, and 2,5-dimethylpiperazine.

5. The process as claimed in claim 4 wherein the piperazine compound (3) is 2-methylpiperazine and the amine compound (2) is 2-(n-butylamino)ethanol.

6. The process as claimed in claim 4 wherein the concentration of the amine compound (2) in the aqueous solution is in the range of 15–65% by weight and the concentration of the piperazine compound (3) is in the range of 1.5–65% by weight where that piperazine compound is soluble in the aqueous solution of the amine compound (2) at 30° C., the combined concentration of (2) and (3) being not more than 70% by weight.

7. A process for removing $CO_2$ from combustion gases comprising contacting a combustion gas at atmospheric pressure with an aqueous solution, having a concentration of 30–50% by weight of a piperazine derivative represented by a general formula (4)

[4]

in which $R^4$ is a methyl, ethyl or group and $R^5$ is hydrogen, methyl, ethyl or propyl group.

8. The process as claimed in claim 7 wherein the piperazine derivative is 2-methylpiperazine.

9. A process for removing $CO_2$ from combustion gases comprising:

contacting a combustion gas with an aqueous solution, at atmospheric pressure, said aqueous solution comprising an amine compound represented by formula (2)

$$R^2CHR^3NCH_2CH_2OH \qquad (2)$$

and a piperazine compound (3); wherein said amine compound is 2-(n-butylamino) ethanol and said piperazine compound is 2-methylpiperazine.

10. A process for removing $CO_2$ from a combustion gas through contact of a combustion gas at atmospheric pressure with an aqueous amine solution wherein said mixed aqueous amine solution consists essentially of a secondary amine selected from a group consisting of 2-methylaminoethanol, 2-ethylaminoethanol, 2-isopropylaminoethanol, 2-n-butylaminoethanol, piperazine, 2-methylpiperazine, 2,5-dimethylpiperazine, and 2-piperidinoethanol and a tertiary amine selected from a group consisting of 2-dimethylaminoethanol, 2-diethylaminoethanol, 3-dimethylamino-1-propanol, 4-dimethylamino-1-butanol, 2-dimethylamino-2-methyl-1-propanol, N-ethyl-N-methylethanolamino; wherein the secondary amine and the tertiary amine are at concentrations of 10–45% by weight each; the combined concentration of the amines in the mixed aqueous solution is not more than 70% by weight; and the concentration of the tertiary amine in the mixed aqueous amine solution is within the range of plus and minus 10% by weight of the concentration of the tertiary amine which, when used singularly in an aqueous solution, achieves the maximum $CO_2$ absorption per unit volume of the singular aqueous solution, the absorption conditions being the same.

11. A process for removing $CO_2$ from a combustion gas through contact of a combustion gas at atmospheric pressure with an aqueous amine solution wherein said mixed aqueous amine solution consists essentially of a secondary amine selected from a group consisting of 2-methylaminoethanol, 2-ethylaminoethanol, 2-isopropylaminoethanol, 2-n-butylaminoethanol, piperazine, 2-methylpiperazine, 2,5-dimethylpiperazine, and 2-piperidinoethanol and a tertiary amine selected from a group consisting of N-methyldiethanolamine, N-ethyldiethanolamine, N-t-butyldiethanolamine, and N-methyldiisopropanolamine; wherein the secondary amine and the tertiary amine are at concentrations of 10–45% by weight each; the combined concentration of the amines in the mixed aqueous solution is not more than 70% by weight; and the concentration of the tertiary amine in the mixed aqueous amine solution is within the range of plus and minus 10% by weight of the concentration of the tertiary amine which, when used singularly in an aqueous solution, achieves the maximum $CO_2$ absorption per unit volume of the singular aqueous solution, the absorption conditions being the same.

* * * * *